United States Patent
Otani

(10) Patent No.: US 10,269,494 B2
(45) Date of Patent: Apr. 23, 2019

(54) MULTILAYER CERAMIC CAPACITOR INCLUDING EXTERNAL ELECTRODES WITH MULTILAYER STRUCTURE AND MANUFACTURING METHOD THEREFOR

(71) Applicant: Murata Manufacturing Co., Ltd., Nagaokakyo-shi, Kyoto-fu (JP)

(72) Inventor: Shinji Otani, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/219,383

(22) Filed: Jul. 26, 2016

(65) Prior Publication Data

US 2017/0032896 A1 Feb. 2, 2017

(30) Foreign Application Priority Data

Jul. 30, 2015 (JP) .................................. 2015-150212

(51) Int. Cl.
*H01G 4/30* (2006.01)
*H01G 4/232* (2006.01)

(52) U.S. Cl.
CPC ............. *H01G 4/30* (2013.01); *H01G 4/232* (2013.01); *H01G 4/2325* (2013.01)

(58) Field of Classification Search
CPC ......... H01G 4/232; H01G 4/2325; H01G 4/30
See application file for complete search history.

(56) References Cited

U.S. PATENT DOCUMENTS

| | | | | |
|---|---|---|---|---|
| 2004/0179326 A1* | 9/2004 | Hattori | .................... | H01G 4/008 361/320 |
| 2006/0044098 A1* | 3/2006 | Kimura | .................... | H01B 1/22 336/122 |
| 2007/0215379 A1* | 9/2007 | Komatsu | .............. | H01G 4/2325 174/258 |
| 2011/0132637 A1* | 6/2011 | Otani | ....................... | C08L 63/00 174/126.1 |
| 2012/0188684 A1* | 7/2012 | Akazawa | ............... | H01G 4/012 361/321.2 |
| 2013/0220696 A1* | 8/2013 | Otani | ....................... | H01G 4/12 174/534 |
| 2014/0160627 A1* | 6/2014 | Kobayashi | ............... | H01G 4/30 361/303 |
| 2015/0279566 A1* | 10/2015 | Otani | ....................... | H01G 4/30 361/301.4 |

FOREIGN PATENT DOCUMENTS

| | | | | |
|---|---|---|---|---|
| JP | 08037127 A | * | 2/1996 | |
| JP | 11-162771 A | | 6/1999 | |
| JP | 2008166666 A | * | 7/2008 | |
| JP | 2012104785 A | * | 5/2012 | |
| JP | WO 2014097823 A1 | * | 6/2014 | ............... H01G 4/30 |

* cited by examiner

*Primary Examiner* — David M Sinclair
(74) *Attorney, Agent, or Firm* — Keating & Bennett, LLP

(57) ABSTRACT

A multilayer ceramic capacitor includes a laminated body including ceramic layers and internal electrodes, and a pair of external electrodes on both end surfaces of the laminated body to be electrically connected to the internal electrodes, and each external electrode includes a base electrode layer containing Cu and provided on the surface of the laminated body, a metallic interlayer containing a $Cu_3Sn$ alloy and provided on the surface of the base electrode layer, and a conductive resin layer provided on the surface of the metallic interlayer.

19 Claims, 2 Drawing Sheets

MULTILAYER CERAMIC CAPACITOR INCLUDING EXTERNAL ELECTRODES WITH MULTILAYER STRUCTURE AND MANUFACTURING METHOD THEREFOR

CROSS REFERENCE TO RELATED APPLICATIONS

This application claims the benefit of priority to Japanese Patent Application 2015-150212 filed Jul. 30, 2015, the entire contents of which are hereby incorporated herein by reference.

BACKGROUND OF THE INVENTION

1. Field of the Invention

The present invention relates to a multilayer ceramic capacitor and a method for manufacturing the capacitor, and more particularly, to a multilayer ceramic capacitor including an external electrode with a multilayer structure, and a method for manufacturing the capacitor.

2. Description of the Related Art

In recent years, multilayer ceramic capacitors have come to be used even under severe environments which are more likely to have impacts on the capacitors than ever before, and thus have been required to have mechanical strength which can cope with environmental conditions. For example, multilayer ceramic capacitors for use in mobile devices such as cellular phones and portable music players are required to withstand drop impacts and the like. Specifically, there is a need for the multilayer ceramic capacitors to be kept from dropping from mounting boards and from being cracked, even when the capacitors are subjected to drop impacts and the like. In addition, multilayer ceramic capacitors for use in in-car devices such as ECUs are required to withstand impacts such as thermal cycles. Specifically, there is a need for the multilayer ceramic capacitors to be kept from being cracked, even when the capacitors are subjected to warping stress and tensile stress applied to external electrodes by linear expansion and shrinkage of mounting boards in thermal cycles.

For the purpose of meeting the demand described above, multilayer ceramic capacitors are known which include external electrodes including thermosetting resin layers. JP11-162771A discloses such a multilayer ceramic capacitor.

The multilayer ceramic capacitor in JP11-162771A includes external electrodes of multilayer structure, including electrode layers as baked electrodes provided on both end surfaces of a capacitor main body, and conductive thermosetting resin layers provided on the surfaces of the electrode layers. In the case of the multilayer ceramic capacitor in JP11-162771A, the electrode layers of the external electrodes of multilayer structure carry the function of ensuring moisture resistance reliability, whereas the thermosetting resin layers thereof carry the function of preventing the capacitor main body from being cracked.

In the case of the multilayer ceramic capacitor as described in JP11-162771A, the thermosetting resin layer includes a resin, thus lowering the content ratio of the metal contained in the thermosetting resin layer. Therefore, the adhesion force has a tendency to be weak between the thermosetting resin layer and the electrode layer provided on the lower surface of the thermosetting resin layer. Thus, the multilayer ceramic capacitor as described in JP11-162771A has the problem of causing ingress of water and the like between the thermosetting resin layer and the electrode layer, thus degrading moisture resistance reliability and electrical characteristics.

SUMMARY OF THE INVENTION

Therefore, preferred embodiments of the present invention provide a multilayer ceramic capacitor which has mechanical strength improved by external electrodes, and has favorable moisture resistance reliability and electrical characteristics with firmly attached base electrode layers and conductive resin layers included in the external electrodes.

Other preferred embodiments of the present invention provide a method for manufacturing a multilayer ceramic capacitor which has mechanical strength improved by external electrodes, and has favorable moisture resistance reliability and electrical characteristics with firmly attached base electrode layers and conductive resin layers included in the external electrodes.

A multilayer ceramic capacitor according to a preferred embodiment of the present invention is a multilayer ceramic capacitor including a laminated body including a plurality of ceramic layers and a plurality of internal electrodes; and a pair of external electrodes provided on the surface of the laminated body and electrically connected to the internal electrodes, where each of the pair of external electrodes includes a base electrode layer containing Cu provided on the surface of the laminated body; a metallic interlayer containing a $Cu_3Sn$ alloy provided on the surface of the base electrode layer; and a conductive resin layer provided on the surface of the metallic interlayer.

Preferably, in the multilayer ceramic capacitor, the metallic interlayer is about 0.1 μm or more and about 23.7 μm or less in thickness, for example.

Preferably, in the multilayer ceramic capacitor, the metallic interlayer is about 0.3 μm or more and about 23.7 μm or less in thickness, for example.

Preferably, in the multilayer ceramic capacitor, the conductive resin layer includes a thermosetting resin and a metal, and the metal includes Cu and Sn, or an alloy thereof.

A method for manufacturing a multilayer ceramic capacitor according to a preferred embodiment of the present invention is a method for manufacturing the multilayer ceramic capacitor according to one of the above-described preferred embodiments of the present invention, the method including the steps of: preparing the laminated body; forming the base electrode layer by applying and baking a conductive paste containing Cu to the surface of the laminated body; and forming the conductive resin layer by applying a conductive resin paste including a conductive filler and a resin to the surface of the base electrode layer and applying a heat treatment to the conductive resin paste, where the heat treatment has a maximum temperature of about 250° C. or higher and about 600° or lower.

In a multilayer ceramic capacitor according to a preferred embodiment of the present invention, the base electrode layer and conductive resin layer in the external electrode of multilayer structure are subjected to metal joining with the metallic interlayer containing a $Cu_3Sn$ alloy interposed therebetween. Thus, the base electrode layer and conductive resin layer included in the external electrode are firmly attached, thus improving the moisture resistance reliability and electrical characteristics. Furthermore, the external electrodes include the conductive resin layers, thus improving the mechanical strength such as substrate bendability resistance and drop impact resistance. As a result, a multilayer ceramic capacitor has mechanical strength improved by external electrodes, and has favorable moisture resistance reliability and electrical characteristics with firmly attached base electrode layers and conductive resin layers included in the external electrodes.

Furthermore, in a multilayer ceramic capacitor according to a preferred embodiment of the present invention, the metallic interlayer is about 0.1 μm or more and about 23.7 μm or less in thickness, thus providing more favorable moisture resistance reliability and electrical characteristics.

Furthermore, in a multilayer ceramic capacitor according to a preferred embodiment of the present invention, the metallic interlayer is about 0.3 μm or more and about 23.7 μm or less in thickness, thus providing more favorable moisture resistance reliability and electrical characteristics.

Furthermore, in a multilayer ceramic capacitor according to a preferred embodiment of the present invention, the conductive resin layer includes the thermosetting resin and the metal, and the metal includes Cu and Sn, or an alloy thereof, thus making it possible to form the metallic interlayer containing a $Cu_3Sn$ alloy.

A method for manufacturing a multilayer ceramic capacitor according to a preferred embodiment of the present invention includes the steps of forming the base electrode layer by applying and baking the conductive paste containing Cu to the surface of the laminated body; and forming the conductive resin layer by applying the conductive resin paste including the conductive filler and the resin to the surface of the base electrode layer and applying the heat treatment to the conductive resin paste, where the heat treatment has a maximum temperature of about 250° C. or higher and about 600° C. or lower. Thus, a multilayer ceramic capacitor is able to be manufactured which has mechanical strength improved by external electrodes, and has favorable moisture resistance reliability and electrical characteristics with firmly attached base electrode layers and conductive resin layers included in the external electrodes.

According to various preferred embodiments of the present invention, a multilayer ceramic capacitor has mechanical strength improved by external electrodes, and has favorable moisture resistance reliability and electrical characteristics with firmly attached base electrode layers and conductive resin layers included in the external electrodes.

In addition, according to a preferred embodiment of the present invention, a multilayer ceramic capacitor is able to be manufactured which has mechanical strength improved by external electrodes, and has favorable moisture resistance reliability and electrical characteristics with firmly attached base electrode layers and conductive resin layers included in the external electrodes.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
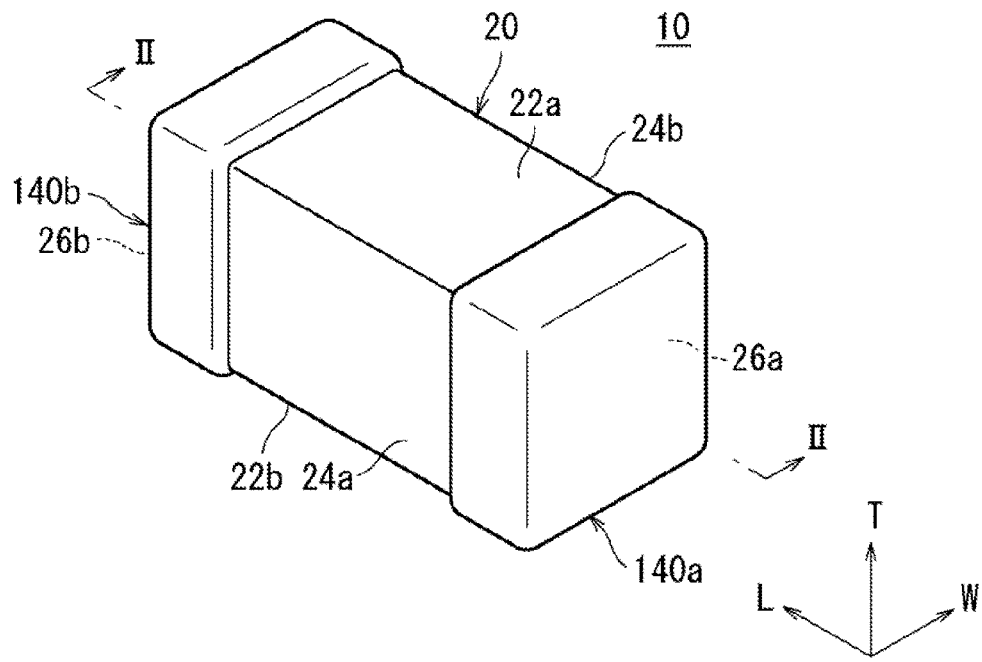
FIG. 1 is an appearance perspective view illustrating a multilayer ceramic capacitor according to a preferred embodiment of the present invention.
Figure 2:
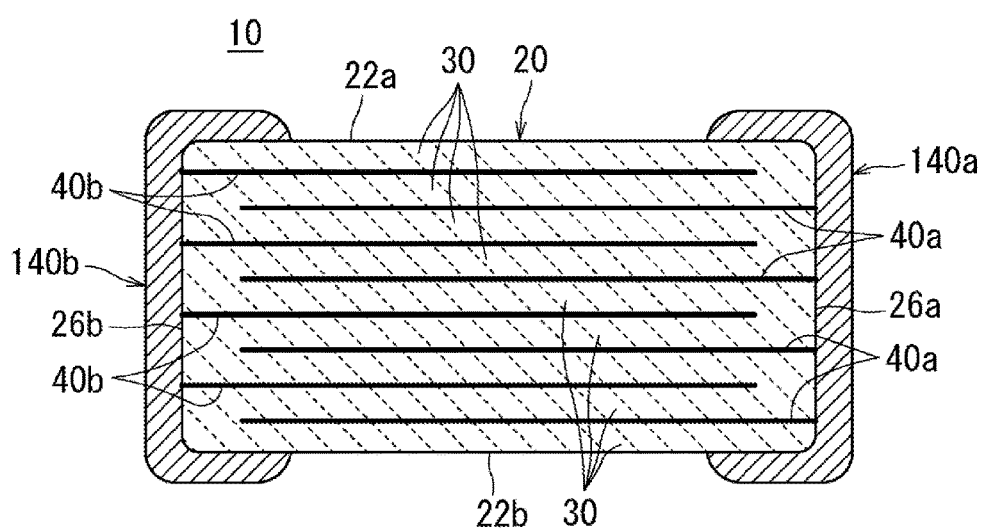
FIG. 2 is a cross-sectional view along the line II-II of FIG. 1, which illustrates the multilayer ceramic capacitor according to a preferred embodiment of the present invention.
Figure 3:
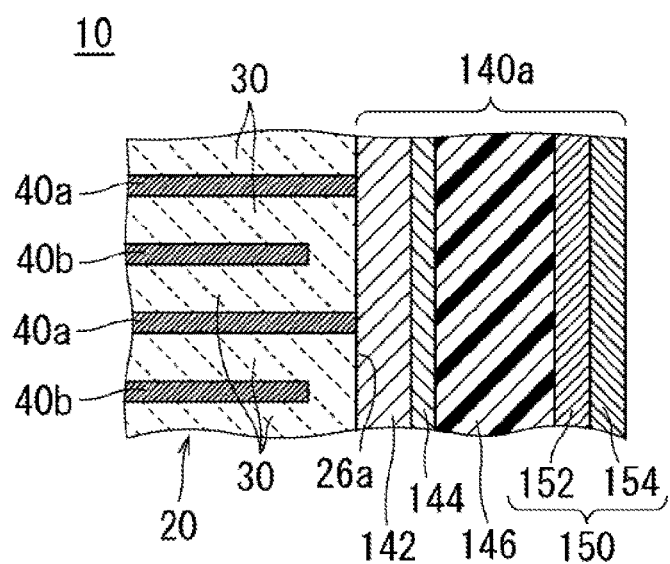
FIG. 3 is an enlarged view of a first external electrode and the vicinity thereof in the cross-sectional view of FIG. 2 illustrating the multilayer ceramic capacitor according to a preferred embodiment of the present invention.

Multilayer ceramic capacitors according to preferred embodiments of the present invention will be described below with reference to the drawings. FIG. 1 is an appearance perspective view illustrating a multilayer ceramic capacitor according to a preferred embodiment of the present invention. FIG. 2 is a cross-sectional view along the line II-II of FIG. 1, which illustrates the multilayer ceramic capacitor according to a preferred embodiment of the present invention. FIG. 3 is an enlarged view of a first external electrode and the vicinity thereof in the cross-sectional view of FIG. 2 illustrating the multilayer ceramic capacitor according to a preferred embodiment of the present invention.

The multilayer ceramic capacitor 10 according to the present preferred embodiment includes a laminated body 20, and a first external electrode 140a and a second external electrode 140b (a pair of external electrodes).

The laminated body 20 preferably is formed by laminating a plurality of ceramic layers 30 and a plurality of first internal electrodes 40a and second internal electrodes 40b.

The laminated body 20 preferably has a cuboid shape, including a first principal surface 22a and a second principal surface 22b that are opposed, a first side surface 24a and a second side surface 24b that are opposed, and a first end surface 26a and a second end surface 26b that are opposed. In this regard, the direction of connecting the first end surface 26a and the second end surface 26b is referred as a length (L) direction, the direction of connecting the first side surface 24a and the second side surface 24b, which is perpendicular to the L direction, is referred to as a width (W) direction, and the direction of connecting the first principal surface 22a and the second principal surface 22b, which is perpendicular to the L direction and the W direction, is referred to as a height (T) direction.

The laminated body 20 preferably has some or all of corners and ridges rounded. In addition, the cuboid shape of the laminated body 20 is not particularly limited, as long as the shape includes the first and second principal surfaces 22a, 22b, the first and second side surfaces 24a, 24b, and the first and second end surfaces 26a, 26b. For example, some or all of the first and second principal surfaces 22a, 22b, first and second side surfaces 24a, 24b, and first and second end surfaces 26a, 26b of the laminated body 20 may include differences in level or protrusions and depressions.

The ceramic layers 30 are sandwiched between the first internal electrodes 40a and the second internal electrodes 40b, and laminated in the T direction. The ceramic layers 30 are preferably about 0.5 μm or more and about 10 μm or less in thickness.

For example, a dielectric ceramic including a main constituent such as $BaTiO_3$, $CaTiO_3$, $SrTiO_3$, and $CaZrO_3$ can be used as the ceramic material of the ceramic layers 30.

Further, accessory constituents such as a Mn compound, a Fe compound, a Cr compound, a Co compound, and a Ni compound may be added to the main constituent.

The first internal electrodes 40a are extended in the shape of a plate at the interfaces between the ceramic layers 30, and exposed at the first end surface 26a of the laminated body 20. On the other hand, the second internal electrodes 40b are extended in the shape of a plate at the interfaces between the ceramic layers 30 to be opposed to the first internal electrodes 40a with the ceramic layers 30 interposed therebetween, and exposed at the second end surface 26b. Therefore, the first and second internal electrodes 40a, 40b have opposed portions that are opposed to each other with the ceramic layers 30 interposed therebetween, and extended portions extended to the first and second end surfaces 26a, 26b. The first internal electrodes 40a and the second internal electrodes 40b are opposed with the ceramic layers 30 interposed therebetween, thus generating electrostatic capacitance. The first and second internal electrodes 40a, 40b are preferably about 0.2 μm or more and about 2.0 μm or less in thickness, for example.

The first and second internal electrodes 40a, 40b are preferably composed of an appropriate conductive material such as metals such as Ni, Cu, Ag, Pd, and Au, an Ag—Pd alloy, or an alloy containing at least one of the metals, for example.

The first external electrode 140a preferably extends from the first end surface 26a of the laminated body 20 to respective portions of the first and second principal surfaces 22a, 22b and respective portions of the first and second side surfaces 24a, 24b, and electrically connected to the first internal electrodes 40a at the first end surface 26a. On the other hand, the second external electrode 140b preferably extends from the second end surface 26b of the laminated body 20 to respective portions of the first and second principal surfaces 22a, 22b and respective portions of the first and second side surfaces 24a, 24b, and electrically connected to the second internal electrodes 40b at the second end surface 26b.

The first and second external electrodes 140a, 140b have a multilayer structure including a base electrode layer 142, a metallic interlayer 144, a conductive resin layer 146, and a plated layer 150. It is to be noted that there is no need for the first and second external electrodes 140a, 140b to include the plated layer 150.

The base electrode layer 142 preferably extends from the first or second end surface 26a, 26b of the laminated body 20 to respective portions of the first and second principal surfaces 22a, 22b and respective portions of the first and second side surfaces 24a, 24b. It is to be noted that the base electrode layer 142 may be provided only on the first or second end surface 26a, 26b of the laminated body 20. The thickest portion of the base electrode layer 142 is preferably, for example, about 10 μm or more and about 50 μm or less in thickness.

The base electrode layer 142 preferably is formed by, for example, applying and baking a conductive paste including a conductive metal and glass. For example, Cu or a Cu alloy can be used as the conductive metal. For example, glass containing B, Si, Ba, Mg, Al, Li, or the like can be used as the glass. The base electrode layer 142 may be formed by co-firing with the first and second internal electrodes 40a, 40b, or by applying and baking the conductive paste.

The metallic interlayer 144 is provided on the surface of the base electrode layer 142 to cover the layer. Specifically, the metallic interlayer 144 is preferably provided on the surface of the base electrode layer 142 on the first or second end surface 26a, 26b of the laminated body 20, and also preferably extends from the surface to the surface of the base electrode layer 142 provided on the respective portions of the first and second principal surfaces 22a, 22b and the respective portions of the first and second side surfaces 24a, 24b. It is to be noted that the metallic interlayer 144 may be provided only on the surface of the base electrode layer 142 on the first or second end surface 26a, 26b of the laminated body 20.

The surface of the metallic interlayer 144 may be roughened. Specifically, the surface roughness Ra of the metallic interlayer 144 preferably has a value of about 0.2 μm or more and about 5.1 μm or less, for example. When the surface roughness Ra of the metallic interlayer 144 has a value smaller than about 0.2 μm, interfacial peeling is likely to be caused between the metallic interlayer 144 and the conductive resin layer 146. Alternatively, when the surface roughness Ra of the metallic interlayer 144 has a value larger than about 5.1 μm, the attached area of the conductive resin layer 146 is excessively reduced, and interfacial peeling is likely to be caused as well.

The metallic interlayer 144 contains a $Cu_3Sn$ alloy. The atomic ratio Cu:Sn (atom %) of the metallic interlayer 144 is about 70 or more and about 80 or less atom %:about 20 or more and about 30 or less atom %, for example. The $Cu_3Sn$ alloy of the metallic interlayer 144 is produced by a reaction between Cu contained in the base electrode layer 142 and Sn contained in the conductive resin layer 146 in a heat treatment step in the case of manufacturing the multilayer ceramic capacitor 10. More specifically, the base electrode layer 142 and the conductive resin layer 146 are subjected to metal joining with the metallic interlayer 144 interposed therebetween.

The metallic interlayer 144 is preferably about 0.1 μm or more and about 23.7 μm or less in thickness. When the metallic interlayer 144 is less than about 0.1 μm in thickness, the $Cu_3Sn$ alloy is insufficiently produced, and the metal joining is thus incomplete, thus weakening the adhesion force between the base electrode layer 142 and the conductive resin layer 146. Further, in the absence of the metallic interlayer 144, metal joining is not achieved between the base electrode layer 142 and the conductive resin layer 146, thus weakening the adhesion force between the base electrode layer 142 and the conductive resin layer 146. Therefore, electrical characteristics are not stabilized, but moreover, sufficient moisture resistance reliability is unable to be achieved. On the other hand, when the thickness of the metallic interlayer 144 exceeds about 23.7 μm, the $Cu_3Sn$ alloy contained in the metallic interlayer 144 undergoes an excessive increase in thickness, and the accumulation of internal stress makes cracks likely to be generated, thus decreasing moisture resistance reliability.

More preferably, the metallic interlayer 144 is about 0.3 μm or more and about 23.7 μm or less in thickness, for example. This thickness makes moisture resistance reliability and electrical characteristics more favorable.

The conductive resin layer 146 is provided on the surface of the metallic interlayer 144 to cover the layer. Specifically, the conductive resin layer 146 is preferably provided on the surface of the metallic interlayer 144 on the first or second end surface 26a, 26b of the laminated body 20, and also preferably extends from the surface to the surface of the metallic interlayer 144 on the respective portions of the first and second principal surfaces 22a, 22b and the respective portions of the first and second side surfaces 24a, 24b. It is to be noted that the conductive resin layer 146 may be provided only on the surface of the metallic interlayer 144 on the first or second end surface 26a, 26b of the laminated body 20. The conductive resin layer 146 is, for example, preferably about 10 μm or more and about 150 μm or less in thickness.

The conductive resin layer 146 includes a conductive filler and a resin.

The particles of the conductive filler may have a spherical shape, a flattened shape, or the like. It is to be noted that when the particles of the conductive filler have a spherical shape, a flattened shape, or the like, the spherical and flattened particles are preferably used in mixture. It is to be noted that the particles of the conductive filler are not particularly limited in terms of shape.

In addition, the average particle size of the conductive filler may be, for example, about 0.3 μm or more and about 10 μm or less, but is not particularly limited.

Cu and Sn, or an alloy containing the metal can be used as the conductive filler. It is for the purpose of forming the metallic interlayer 144 containing a $Cu_3Sn$ alloy that Cu and Sn, or an alloy containing the metal is used.

The conductive filler mainly handles conduction in the conductive resin layer 146. Specifically, the contact of the conductive filler defines a conduction path within the conductive resin layer 146.

As the resin included in the conductive resin layer 146, known thermosetting resins can be used such as epoxy resins, phenolic resins, urethane resins, silicone resins, and polyimide resins, for example. In particular, it is preferable to use an epoxy resin as the resin included in the conductive resin layer 146. The epoxy resin is excellent in heat resistance, moisture resistance, adhesion, and the like, and one of the most appropriate resins. The conductive resin layer 146 preferably includes a curing agent in addition to the thermosetting resin. As the curing agent, in the case of using an epoxy resin as the thermosetting resin, known compounds can be used, such as phenolic, amine, acid anhydride, and imidazole compounds.

The conductive resin layer 146 have, because of including the resin, more flexibility as compared with, for example, a conductive layer including a plated film or a fired product of a conductive paste. Therefore, the conductive resin layer 146 defines and functions as a layer that buffers the impacts caused by physical impacts or thermal cycles applied to the multilayer ceramic capacitor 10. This layer prevents the multilayer ceramic capacitor 10 from being cracked or the like. More specifically, the multilayer ceramic capacitor 10 includes the conductive resin layer 146, thus improving the mechanical strength such as substrate bendability resistance and drop impact resistance.

The plated layer 150 is provided on the surface of the conductive resin layer 146 to cover the layer. Specifically, the plated layer 150 is preferably provided on the surface of the conductive resin layer 146 provided on the first or second end surface 26a, 26b of the laminated body 20, and also preferably extends from the surface to the surface of the conductive resin layer 146 provided on the respective portions of the first and second principal surfaces 22a, 22b and the respective portions of the first and second side surfaces 24a, 24b. It is to be noted that the plated layer 150 may be provided only on the surface of the conductive resin layer 146 provided on the first or second end surface 26a, 26b of the laminated body 20.

The plated layer 150 contains at least one selected from Cu, Ni, Sn, Ag, Pd, Ag—Pd alloys, Au, and the like.

The plated layer 150 preferably has a two-layer structure including a first plated layer 152 and a second plated layer 154. It is to be noted that the plated layer 150 may have a single-layer structure composed of only the first plated layer 152, or a multilayer structure including three or more layers. The plated layer 150 is preferably about 1 μm or more and about 15 μm or less in thickness per layer, for example.

The first plated layer 152 is provided on the surface of the conductive resin layer 146 to cover the layer. The first plated layer 152 is preferably a Ni plated layer. Thus, in mounting the multilayer ceramic capacitor 10 onto a mounting board, the base electrode layer 142 or the conductive resin layer 146 is prevented from being eroded by a solder for use in the mounting. In addition, the first plated layer 152 may have a multilayer structure.

The second plated layer 154 is provided on the surface of the first plated layer 152 to cover the layer.

The second plated layer 154 is preferably a Sn plated layer. Thus, in mounting the multilayer ceramic capacitor 10 onto a mounting board, the wettability of the solder for use in the mounting is improved to the external electrodes 140a, 140b. Therefore, the multilayer ceramic capacitor 10 is easily mounted.

For the multilayer ceramic capacitor 10 according to a preferred embodiment of the present invention, the base electrode layers 142 and conductive resin layers 146 in the external electrodes 140a, 140b of multilayer structure are subjected to metal joining with the interposed metallic interlayers 144 containing a $Cu_3Sn$ alloy. Thus, the base electrode layers 142 and conductive resin layers 146 included in the external electrodes 140a, 140b are firmly attached, thus improving the moisture resistance reliability and the electrical characteristics. Furthermore, the external electrodes 140a, 140b include the conductive resin layers 146, thus improving the mechanical strength such as substrate bendability resistance and drop impact resistance. As a result, the multilayer ceramic capacitor 10 has mechanical strength improved by the external electrodes 140a, 140b, and has favorable moisture resistance reliability and electrical characteristics with the firmly attached base electrode layers 142 and conductive resin layers 146 included in the external electrodes 140a, 140b.

Furthermore, in the multilayer ceramic capacitor 10 according to a preferred embodiment of the present invention, the metallic interlayer 144 is about 0.1 μm or more and about 23.7 μm or less in thickness, thus providing more favorable moisture resistance reliability and electrical characteristics.

Furthermore, in the multilayer ceramic capacitor 10 according to a preferred embodiment of the present invention, the metallic interlayer 144 is about 0.3 μm or more and about 23.7 μm or less in thickness, thus providing more favorable moisture resistance reliability and electrical characteristics.

Furthermore, in the multilayer ceramic capacitor 10 according to a preferred embodiment of the present invention, the conductive resin layer 146 includes a thermosetting resin and a metal, and the metal includes Cu and Sn, or an alloy thereof, thus making it possible to form the metallic interlayer 144 containing a $Cu_3Sn$ alloy.

Subsequently, a non-limiting example of a method for manufacturing the multilayer ceramic capacitor will be described.

First, a ceramic paste including a ceramic powder is applied in the form of a sheet by a screen printing method or the like, and dried to form ceramic green sheets.

Next, a conductive paste for internal electrode formation is applied in a predetermined pattern to the surfaces of the ceramic green sheets by, for example, a screen printing method or the like, thus providing the ceramic green sheets with the formed conductive patterns for internal electrode formation. In addition, ceramic green sheets without any formed conductive pattern for internal electrode formation are also obtained. Further, the ceramic paste and the conductive paste for internal electrode formation may include, for example, known binders and solvents.

Then, the ceramic green sheets without any formed conductive pattern for internal electrode formation are stacked to reach a predetermined number of sheets, on the surface thereof, the ceramic green sheets with the formed conductive patterns for internal electrode formation are stacked, and on the surface thereof, the ceramic green sheets without any formed conductive pattern for internal electrode formation are stacked to reach a predetermined number of sheets. In this way, a mother stacked body is produced.

Further, if necessary, the mother stacked body may be pressed in the stacking direction. For example, isostatic pressing or the like is conceivable as a method for pressing the mother stacked body.

Furthermore, the mother stacked body is cut into a size in a predetermined shape, thus forming a plurality of raw stacked bodies. It is to be noted that in this regard, the raw stacked bodies may be subjected to barrel polishing or the like to form rounded ridges and corners.

Finally, the raw stacked bodies are subjected to firing to form laminated bodies where first and second internal electrodes are disposed inside, and the first internal electrodes have ends extended to a first end surface, whereas the second internal electrodes have ends extended to a second end surface. It is to be noted that the firing temperature for the raw stacked bodies can be appropriately set, depending on the ceramic material and the conductive material. The firing temperature for the raw stacked bodies can be adjusted to, for example, about 900° C. or higher and about 1300° C. or lower.

First, a conductive paste is applied and baked to both end surfaces of the laminated bodies obtained in the way described above, thus forming base electrode layers of external electrodes. The baking temperature in this case is preferably about 700° C. or higher and about 900° C. or lower.

Next, a conductive resin paste including a conductive filler and a resin is applied to cover the base electrode layers, and subjected to a heat treatment at a maximum temperature of about 250° C. or higher and about 600° C. or lower, thus thermally curing the resin. In this way, conductive resin layers are formed to cover the base electrode layers. In this regard, metallic interlayers are formed between the base electrode layers and the conductive resin layers. The thickness of the metallic interlayer can be adjusted by changing the maximum temperature for the heat treatment or the heat treatment time. In this preferred embodiment, the thickness of the metallic interlayer is adjusted by changing the maximum temperature for the heat treatment. Specifically, the thickness of the metallic interlayer is able to be reduced by lowering the maximum temperature for the heat treatment, and reversely, is able to be increased by raising the temperature.

It is to be noted that the atmosphere for the heat treatment is preferably a $N_2$ atmosphere. In addition, the oxygen concentration is preferably reduced to about 100 ppm or less. Thus, the resin is able to be prevented from flying, and various types of metallic constituents are prevented from being oxidized.

Then, if necessary, Ni plated layers (first plated layers) are formed on the surfaces of the conductive resin layers. Electrolytic plating can be used for the method for forming the Ni plated layers.

In addition, if necessary, Sn plated layers (second plated layers) are formed on the surfaces of the Ni plated layers (first plated layers).

In the way described above, the multilayer ceramic capacitor according to a preferred embodiment of the present invention is manufactured.

An experimental example will be described below which was provided by the inventors for confirming the advantageous effects of various preferred embodiments of the present invention. In the experimental example, in accordance with the above-mentioned method for manufacturing a multilayer ceramic capacitor, 160 samples (70 samples for a moisture resistance reliability test, 30 samples for an electrical characteristics test, 30 samples for a mechanical strength test, and 30 samples for the analysis of metallic interlayers) according to each of Examples 1 to 9 and Comparative Example 1 were prepared, and evaluated for moisture resistance reliability, electrical characteristics, and mechanical strength.

Here are multilayer ceramic capacitors as the samples according to Examples 1 to 9 and Comparative Example 1.

Size (designed value) L×W×T: 1.0 mm×0.5 mm×0.5 mm

Ceramic material: $BaTi_2O_3$

Electrostatic capacitance: 2.2 µF

Rated voltage: 6.3 V

Structure of external electrode: multilayer structure of base electrode layer, metallic interlayer, conductive resin layer, and plated layer Base electrode layer: baked electrode containing conductive metal (Cu) and glass Metallic interlayer: $Cu_3Sn$ alloy Conductive resin layer: conductive filler containing Cu and Sn, and resin containing resol-type phenolic resin Structure of plated layer: two-layer structure of Ni plated layer (first plated layer) and Sn-plated layer (second plated layer)

Heat treatment condition: time period of 18 min in a $N_2$ atmosphere

The samples according to Examples 1 to 9 and Comparative Example 1 were adjusted by changing the maximum temperature for the heat treatment, so as to differ from each other in the substantial thickness of the $Cu_3Sn$ alloy. Here are specific examples.

In Comparative Example 1, the maximum temperature for the heat treatment was adjusted to 200° C., and the substantial thickness of the $Cu_3Sn$ alloy was adjusted to 0 µm.

In Example 1, the maximum temperature for the heat treatment was adjusted to 250° C., and the substantial thickness of the $Cu_3Sn$ alloy was adjusted to 0.1 µm.

In Example 2, the maximum temperature for the heat treatment was adjusted to 260° C., and the substantial thickness of the $Cu_3Sn$ alloy was adjusted to 0.3 µm.

In Example 3, the maximum temperature for the heat treatment was adjusted to 300° C., and the substantial thickness of the $Cu_3Sn$ alloy was adjusted to 0.8 µm.

In Example 4, the maximum temperature for the heat treatment was adjusted to 350° C., and the substantial thickness of the $Cu_3Sn$ alloy was adjusted to 2.4 µm.

In Example 5, the maximum temperature for the heat treatment was adjusted to 400° C., and the substantial thickness of the $Cu_3Sn$ alloy was adjusted to 5.6 µm.

In Example 6, the maximum temperature for the heat treatment was adjusted to 450° C., and the substantial thickness of the $Cu_3Sn$ alloy was adjusted to 8.9 µm.

In Example 7, the maximum temperature for the heat treatment was adjusted to 500° C., and the substantial thickness of the $Cu_3Sn$ alloy was adjusted to 14.5 µm.

In Example 8, the maximum temperature for the heat treatment was adjusted to 550° C., and the substantial thickness of the $Cu_3Sn$ alloy was adjusted to 23.7 µm.

In Example 9, the maximum temperature for the heat treatment was adjusted to 600° C., and the substantial thickness of the $Cu_3Sn$ alloy was adjusted to 30.2 µm.

The moisture resistance reliability, electrical characteristics, and mechanical strength were evaluated for each of Examples 1 to 9 and Comparative Example 1.

The test on moisture resistance reliability was carried out as follows. Each sample was mounted by reflow onto a glass epoxy board with the use of Sn-3.0Ag-0.5Cu as a common lead-free solder. Thereafter, a humidity load acceleration test was carried out under a condition of 72 hours by applying a rated voltage of 6.3 V to each sample in a high-temperature and high-humidity tank at 125° C., relative humidity of 95% RH, and 1.2 atmospheres, thus measuring Log IR. For the respective samples according to the examples and the comparative example, a case with two or more samples of less than 6 in Log IR was evaluated as ×, a case with only one sample of less than 6 in Log IR was evaluated as Δ, a case with all of samples successfully kept at 6 or more in Log IR was evaluated as ○, and a case with all of samples successfully kept at 6 or more in Log IR even for 144 h (doubling time) was evaluated as ⊙. The number of evaluation samples was 70 for the humidity load acceleration test.

The test on electrical characteristics was carried out as follows. For each sample, an electrical characteristics test was carried out by scanning at a voltage of 1 Vrms and a frequency of 1 kHz to 10 MHz with the use of an impedance analyzer (4294A from Agilent Technologies), thus measuring the ESR at 1 MHz. It is to be noted that 16044A from Agilent Technologies was used for the test fixture. The sample with an average value for ESR in excess of on average 50 mΩ was evaluated as ×, the sample with an average value therefor of on average 50 mΩ or less was evaluated as ○, and the sample with an average value therefor of on average 10 mΩ or less was evaluated as ⊙. The number of evaluation samples was 30 for the electrical characteristics test.

The test on mechanical strength was carried out as follows. Reflow mounting was carried out onto a JETTA land board with the use of a lead-free solder (Sn-3.0Ag-0.5Cu). The board was warped by 1 mm every second, and kept for 5 seconds when the warpage reached 10 mm. Thereafter, the chip was removed from the board, embedded in a resin, and polished to follow the length direction of the multilayer ceramic capacitor until reaching a cross section approximately at a ½ location of the dimension of the multilayer ceramic capacitor in the width direction (W/2 location). Whether or not any crack is present was observed at an end edge of the base electrode layer of the exposed cross section, and the laminated body without any crack generated was evaluated as ⊙. The number of evaluation samples was 30 for the mechanical strength.

Here is a method for analyzing whether or not the external electrode of the multilayer ceramic capacitor as each sample of Examples and Comparative Example includes the metallic interlayer. The multilayer ceramic capacitor selected in a random manner was embedded in a resin, and polished to follow the length direction of the multilayer ceramic capacitor until reaching a cross section approximately at a ½ location of the dimension of the multilayer ceramic capacitor in the width direction (W/2 location). Thereafter, at the exposed cross section, a reflection electron image of the external electrode in the end surface center of the multilayer ceramic capacitor was observed at 1500-fold magnification with the use of an FE-SEM. The sample with metallic interlayer formation successfully observed (the sample with a reaction layer) was determined to be a sample including the metallic interlayer.

The samples with metallic interlayer formation successfully observed by the analysis method mentioned above were analyzed for whether or not the metallic interlayer includes a $Cu_3Sn$ alloy. This analysis method is as follows. Optional three points in the metallic interlayer were subjected to a point analysis with the use of energy dispersive X-ray analysis EDX (acceleration voltage: 10 kV), thus determining the metallic composition ratio (atomic ratio Cu:Sn) of Cu and Sn. In the case of the atomic ratio Cu:Sn within the range of 70 or more and 80 or less atom %:20 or more and 30 or less atom % at all of the three points, it was determined that the metallic interlayer includes a $Cu_3Sn$ alloy.

The thickness of the metallic interlayer was measured at the exposed cross section obtained by polishing the multilayer ceramic capacitor until reaching a cross section at a ½ location of the dimension of the capacitor in the width direction (W/2 location). The measurement method is as follows. First, at a central location (T/2 position) of the exposed cross section, a line analysis (mapping) on two elements of Cu and Sn was carried out in the thickness direction of the external electrode. Next, a region with the atomic ratio Cu:Sn within the range of 70 or more and 80 or less atom %:20 or more and 30 or less atom % was determined to be the metallic interlayer including a $Cu_3Sn$ alloy, and the thickness of the metallic interlayer was measured there.

Table 1 shows the results of evaluating moisture resistance reliability, electrical characteristics, and mechanical strength properties for Examples 1 to 9 and Comparative Example 1.

TABLE 1

| | | Substantial Thickness of $Cu_3Sn$ (μm) | Maximum Temperature for Heat Treatment (° C.) | Moisture Resistance Reliability | Electrical Characteristics | Mechanical Strength |
|---|---|---|---|---|---|---|
| Comparative Example | 1 | 0 | 200 | X | X | ⊙ |
| Example | 1 | 0.1 | 250 | ○ | ⊙ | ⊙ |
| | 2 | 0.3 | 260 | ⊙ | ⊙ | ⊙ |
| | 3 | 0.8 | 300 | ⊙ | ⊙ | ⊙ |
| | 4 | 2.4 | 350 | ⊙ | ⊙ | ⊙ |
| | 5 | 5.6 | 400 | ⊙ | ⊙ | ⊙ |
| | 6 | 8.9 | 450 | ⊙ | ⊙ | ⊙ |
| | 7 | 14.5 | 500 | ⊙ | ⊙ | ⊙ |
| | 8 | 23.7 | 550 | ⊙ | ⊙ | ⊙ |
| | 9 | 30.2 | 600 | Δ | ⊙ | ⊙ |

As shown in Table 1, Examples 1 to 9 have favorably achieved ⊙ in all respects, except for ○ in Example 1 and Δ in Example 9 in regard to moisture resistance reliability. On the other hand, Comparative Example 1 has achieved ⊙ in regard to mechanical strength, but × in regard to moisture resistance reliability, and also × in regard to electrical characteristics, and thus resulting in being regarded as a defective. This evaluation result has successfully confirmed that the multilayer ceramic capacitor includes the metallic interlayers of a $Cu_3Sn$ alloy, thus making both the moisture resistance reliability and the electrical characteristics favorable, as compared with a case including no metallic interlayer of a $Cu_3Sn$ alloy.

Furthermore, among Examples 1 to 9, Examples 1 to 8 have favorably achieved ⊙ in all respects, except for ○ in Example 1 in regard to moisture resistance reliability. This evaluation result has successfully confirmed that the multilayer ceramic capacitor has a substantial thickness of $Cu_3Sn$ alloy within the range of about 0.1 μm or more and about 23.7 μm or less, thus making the moisture resistance reliability and the electrical characteristics more favorable.

Furthermore, among Examples 1 to 9, Examples 2 to 8 have favorably achieved ⊙ in all respects in regard to moisture resistance reliability and electrical characteristics. This evaluation result has successfully confirmed that the multilayer ceramic capacitor has a substantial thickness of $Cu_3Sn$ alloy within the range of about 0.3 μm or more and about 23.7 μm or less, thus making the moisture resistance reliability and the electrical characteristics more favorable.

It is to be noted that the present invention is not limited to the preferred embodiments described previously, but various modifications can be made within the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
    a laminated body including a plurality of ceramic layers and a plurality of internal electrodes; and
    a pair of external electrodes provided on a surface of the laminated body to be electrically connected to the internal electrodes; wherein
    each of the pair of external electrodes includes:
        a base electrode layer containing Cu and provided on the surface of the laminated body;
        a metallic interlayer containing a $Cu_3Sn$ alloy and provided on a surface of the base electrode layer; and
        a conductive resin layer provided on a surface of the metallic interlayer such that the metallic interlayer is layered on the conductive resin layer;
    the conductive resin layer includes a conductive filler and a resin; and
    the conductive filler includes a mixture including particles with a spherical shape and particles with a flattened shape.

2. The multilayer ceramic capacitor according to claim 1, wherein the metallic interlayer is about 0.1 μm or more and about 23.7 μm or less in thickness.

3. The multilayer ceramic capacitor according to claim 1, wherein the metallic interlayer is about 0.3 μm or more and about 23.7 μm or less in thickness.

4. The multilayer ceramic capacitor according to claim 1, wherein the conductive resin layer includes a thermosetting resin and a metal, and the metal includes Cu and Sn, or an alloy thereof.

5. The multilayer ceramic capacitor according to claim 1, wherein each of the plurality of ceramic layers has a thickness of about 0.5 μm or more and about 10 μm or less.

6. The multilayer ceramic capacitor according to claim 1, wherein each of the plurality of internal electrodes has a thickness of about 0.2 μm or more and about 2.0 μm or less.

7. The multilayer ceramic capacitor according to claim 1, wherein each of the pair of external electrodes further includes a plated layer on the conductive resin layer.

8. The multilayer ceramic capacitor according to claim 7, wherein the plated layer has a multilayer structure.

9. The multilayer ceramic capacitor according to claim 8, wherein each layer of the multilayer structure of the plated layer has a thickness of about 1 μm or more and about 15 μm or less.

10. The multilayer ceramic capacitor according to claim 7, wherein the plated layer includes a Ni plated layer and an Sn plated layer.

11. The multilayer ceramic capacitor according to claim 1, wherein a thickest portion of the base electrode layer has a thickness of about 10 μm or more and about 50 μm or less.

12. The multilayer ceramic capacitor according to claim 1, wherein a surface of the metallic interlayer is roughened.

13. The multilayer ceramic capacitor according to claim 1, wherein a surface of the metallic interlayer has a surface roughness of about 0.2 μm or more and about 5.1 μm or less.

14. The multilayer ceramic capacitor according to claim 1, wherein the conductive resin layer has a thickness of about 10 μm or more and about 150 μm or less.

15. The multilayer ceramic capacitor according to claim 1, wherein the conductive filler includes particles with an average particle size of about 0.3 μm or more and about 10 μm or less.

16. The multilayer ceramic capacitor according to claim 1, wherein the metallic interlayer does not include resin or glass.

17. A method for manufacturing the multilayer ceramic capacitor according to claim 1, the method comprising the steps of:
    preparing the laminated body;
    forming the base electrode layer by applying and baking a conductive paste containing Cu to the surface of the laminated body; and
    forming the conductive resin layer by applying a conductive resin paste including the conductive filler and the resin to the surface of the base electrode layer and applying a heat treatment to the conductive resin paste; wherein
    the heat treatment is performed at a temperature of about 250° C. or higher and about 600° C. or lower.

18. The method according to claim 17, wherein the metallic interlayer is about 0.1 μm or more and about 23.7 μm or less in thickness.

19. The method according to claim 17, wherein the metallic interlayer is about 0.3 μm or more and about 23.7 μm or less in thickness.

* * * * *